Feb. 20, 1962   J. G. PINTA ET AL   3,021,557
MACHINES FOR STRIPPING AND DEHAIRING HOG CARCASSES
Filed May 13, 1960   2 Sheets-Sheet 1
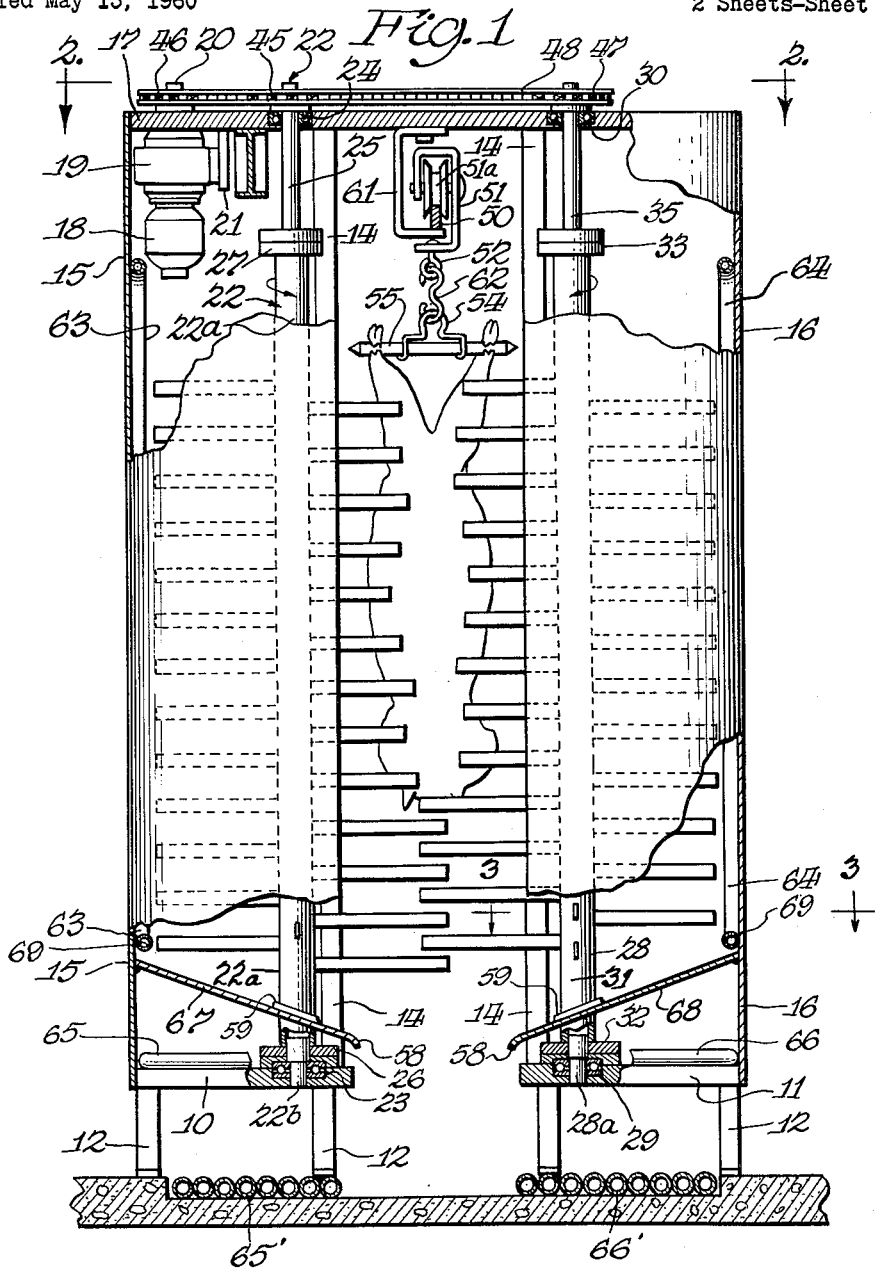
INVENTORS
Fred A. Di Pasquale
John G. Pinta
John Peasley
By: John F. Brezina
Att'y Feb. 20, 1962  J. G. PINTA ET AL  3,021,557
MACHINES FOR STRIPPING AND DEHAIRING HOG CARCASSES
Filed May 13, 1960  2 Sheets-Sheet 2
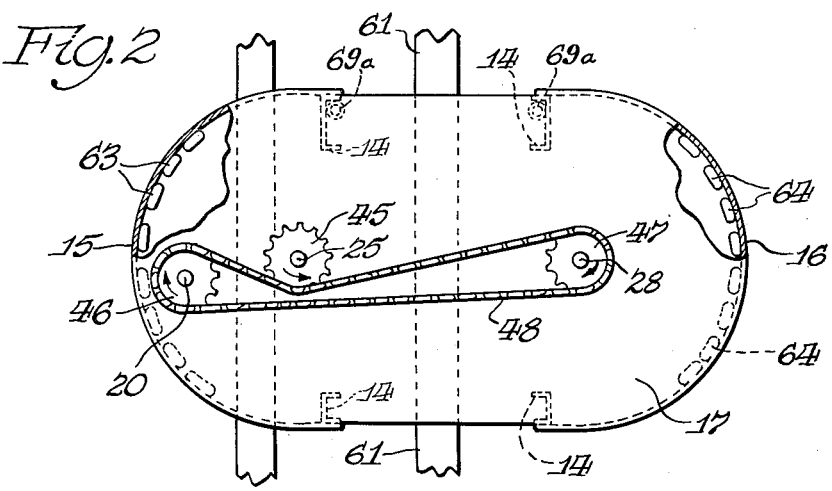
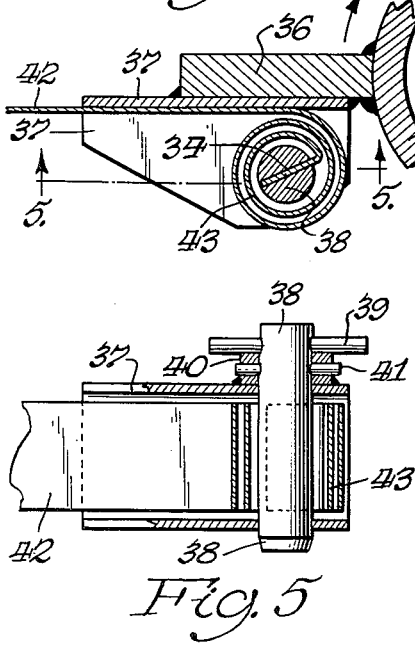
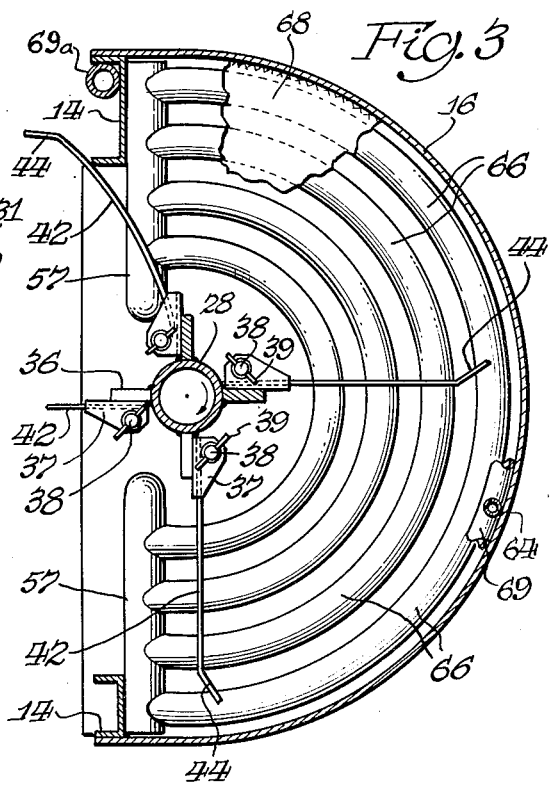
INVENTOR.
Fred A. Di Pasquale
John G. Pinta
John Peasley
BY: John F. Brezina
att'y

United States Patent Office 3,021,557
Patented Feb. 20, 1962

3,021,557
MACHINES FOR STRIPPING AND DEHAIRING HOG CARCASSES
John G. Pinta and Fred A. Di Pasquale, Chicago, and John Peasley, Palos Park, Ill., assignors to Reliable Packing Company, Chicago, Ill., a corporation of Illinois
Filed May 13, 1960, Ser. No. 29,036
11 Claims. (Cl. 17—17)

This invention is directed to machines for stripping coatings of rosin or the like for the purpose of removing hair and foreign material from carcasses of hogs or the like during the normal slaughtering processes thereof.

In presently known methods, hog carcasses are first scalded in hot water and then a major part of the hair is removed by means of scrapers or by mechanically driven and actuated scrapers. Said normal scraping does not remove most of the fine hair and dirt from the skin. The carcasses are then dipped in a relatively soft, hot, flowable liquid mixture of rosin which is maintained at a temperature of approximately 250 to 280 degrees F. The carcasses are then withdrawn from the rosin mix in the tank and the rosin congeals to form a relatively thick flexible coating which contains the projecting portions of the remaining hair. It is then necessary to remove the soft flexible rosin coating containing the hair by use of hand scrapers in addition to hand scraping various parts of the hog to remove the hair and foreign matter which is not removed along with the rosin coating.

There have been some types of hog dehairing machines devised which necessitate a passage and movement of the hog carcasses longitudinally in a substantially horizontal path; that is, placing and moving the carcasses on their sides and moving such carcasses endwise and substantially horizontally while beaters engage the carcass surfaces and until the carcasses are discharged or withdrawn end first from the discharge end of the machine. In such prior machines it is very difficult and necessitates a great amount of labor to move the carcasses through the machines and objectionable features thereof include the necessity of separately removing the carcasses from their hung and suspended positions on overhead tracks and trolleys; and also the labor and time consumed in moving the carcasses longitudinally through the machines while the carcasses are in lying down positions; in then re-hanging the carcasses on hooks of overhead conveyors and trolleys after the carcasses are discharged end first and horizontally from such presently known machines; and the further objection that present machines do not remove the fine hair, the dirt and outer skin from the carcasses.

The following are important objects and advantages of our novel stripping and dehairing machines herein described:

(1) To provide automatic means and power driven mechanism for stripping coatings and removing hair and foreign matter from hog carcasses while the same are hung and suspended on hooks carried on rollers riding on substantially horizontal overhead tracks and conveyors, to thereby maintain the carcasses in depending hung vertical positions during the removal of the hair and also provide for continued movement thereof along the tracks and conveyors to various other positions in the slaughtering room wherein other steps such as dressing of the carcasses are successively performed to completely prepare and divide the carcasses for entry into cooling rooms, all such steps being performed while the carcasses are suspended on and moved along overhead conveyor tracks.

(2) To provide a machine having a plurality of vertically extending power driven shafts and a plurality of radially and transversely extending flexible arms and scrapers mounted on said shafts in alternate and staggered positions and which have manually adjustable means for varying the tension of said arms and scrapers, and which arms and scrapers move in different horizontal planes and whose free ends engage and scrape rosin coatings from the exterior surfaces of the carcasses as such carcasses are vertically positioned and intermittently moved and rotated between two or more of said arm-carrying rotatably driven devices; and in which the flexible arms and scrapers yieldably scrape and remove the rosin coatings containing hair and outer skin from the entire outer surfaces of the hog carcasses.

(3) To provide power driven machines having the power driven flexible arm-carrying devices recited in the preceding paragraph and having manually controlled means and mechanism for selectively rotating said carcass scraping and dehairing devices in opposite directions and having means for rotatably suspending the carcasses and for rotating the hog carcasses while the same are suspended relative to the trolleys and rotatable suspension means with respect to the overhead conveyors and tracks, to thereby repeatedly and successively present the different parts of the hog carcasses of varying sizes to the scraping and stripping action of the flexible arms and scrapers for varying periods of time according to the requirements and condition of the particular carcass being worked upon by said scrapers.

On the drawings:

FIG. 1 is a side elevation with parts broken away of our novel carcass dehairing machine and illustrating a typical hog carcass suspended in position therein.

FIG. 2 is a top plan view with parts broken away taken on a plane indicated by line 2—2 of FIG. 1.

FIG. 3 is an enlarged cross sectional view looking downward from a plane indicated by line 3—3 of FIG. 1.

FIG. 4 is an enlarged fragmentary cross sectional view taken on a horizontal plane illustrating one of the yieldable arms and scrapers and the means of mounting same relative to one of the vertical shafts to which the same is connected.

FIG. 5 is an enlarged cross section taken on a vertical plane indicated by line 5—5 of FIG. 4.

As shown on the drawings:

Numerals 10 and 11 designate two apertured metal bases or base plates which are preferably of semi-circular shape which are supported by a plurality of spaced apart vertical legs 12 whose upper ends are suitably connected to said base plates 10 and 11.

A plurality of vertical channel-like standards or supporting bars 14 (preferably four thereof) have their lower ends suitably secured, for example by welding, at spaced apart positions to the base plates 10 and 11 respectively, in positions as illustrated in dotted lines in FIG. 2. Two of said vertical bars 14 are shown in FIG. 1.

A semi-cylindrical metal wall 15 is suitably secured, as by welding, to the curved edge of base plate 10 and its vertical edges are similarly secured to two of the vertical bars 14 as illustrated at the left of FIG. 1.

A second semi-cylindrical metal wall 16 has its lower edge portion secured, as by welding, to the periphery of base plate 11, and has its two vertical edges secured by welding to the other two vertical bars 14, as illustrated at the right of FIG. 1.

An oval-shaped metal top and mounting plate 17 having a plurality of apertures therein has its two curved end edge portions secured by welding to the upper curved edge portions of the curved walls 15 and 16 respectively. The inwardly extending vertical edges of the walls 15 and 16 and the adjacent respective vertical channel-like bars connected thereto are substantially spaced from the vertical edges of the other curved wall 16 so that a relatively wide space and path is formed between said respective walls which is sufficiently wide and high to provide for movement therethrough and rotation therein of suspended hog carcasses. Accordingly aforesaid structures provide two separate supported semi-cylindrical casings or housings suitably spaced apart and opening toward each other.

Mounted in the lower part of each of said casings are two downwardly and inwardly inclined metal aprons or guards, 67 and 68 respectively, whose peripheral edges are secured by welding to the inner faces of walls 15 and 16 respectively. Each of said panel-like aprons, 67 and 68, has a suitable aperture or slot in its middle portion through which the vertical shafts 22 and 28 extend, and the innermost edges, 58, of said aprons project inwardly into the space between the base plates 10 and 11. Mounted over the slot of each of said aprons 67 and 68 and surrounding the lower portions of the pipes 22a and 31 is a cap-like metal sealing guard 59 which seals the spaces between the said pipes and said aprons about the said slots so that water, hair and foreign matter will not enter and clog the lower bearings 23 and 29 in which the vertical shafts are mounted.

As shown at the upper left of FIG. 1, a prime mover such as an electric motor 18 and a suitable speed reducer 19 connected thereto are suitably mounted and connected to the top plate 17, by bolts not shown, so that the driven stub shaft 20 of the speed reducer 19 extends through and is journalled in a hole in top plate 17. Said motor 18 and speed reducer 19 are mounted on the lower side of said top plate 17. The upper projecting end of the stub shaft 20 has a sprocket 46 secured thereon, which is adapted to drive a chain hereinafter described. Said speed reducer is also secured by bolts, not shown, to a depending bracket 21, which is secured to the under side of top plate 17.

A vertical shaft 22, shown at the left of FIG. 1, which is composed of a long metal pipe 22a and two reduced stub shafts 22b and 25 secured in the opposite ends thereof, has its lower reduced stub shaft 22b journalled in a ball bearing 23 which is mounted in a hole in base plate 10. The upper stub shaft 25 is connected to the end of hollow shaft 22a by a pair of secured together ring-like couplings 27, and its upper end is journalled in upper ball bearing 24 mounted in top mounting plate 17. The lower stub shaft 22b and the lower end of hollow shaft 22a has a metal flange or ring 26 secured by welding thereon.

A similar metal vertical shaft 28 shown at the right of FIG. 1, has a stub shaft 28a secured by welding in its lower reduced end and it is journalled in a lower bearing 29 mounted in an aperture in lower base plate 11. A stub shaft 35 has its lower end secured in the upper end of the hollow part 31 of shaft 28 and is journalled in upper ball bearing 30 mounted in a hole in top plate 17. The upper ends of both said shafts 25 and 35 project above the top mounting plate 17.

The hollow pipe portion 31 of shaft 28 has its lower end secured by welding to lower metal ring 32 and to stub shaft 28a. Upper metal shaft 35 is secured by welding to metal ring-like couplings 33 and to the upper end of the hollow pipe-like portion of said shaft 28, shown at the right of FIG. 1.

As shown in FIGS. 3 and 4, each of the pipes 31 and 22a have secured thereto by welding a plurality of horizontally and ratially extending short extensions, lugs or arms 36 in circumferentially spaced relation, there being preferably four such lugs staggered vertically in each set and extending approximately 90 degrees apart, as shown in FIGS. 1 and 3. The sets of lugs 36 on each pipe are disposed therealong, so that the lugs are staggered for the effective length of the pipe. The sets of lugs 36 on one pipe 31 are staggered vertically from the lugs 36 on the other pipe 22a so that the arms attached thereto will overlap and yet not strike each other at the center of the machine in rotative movement.

Secured by welding on each of the lugs 36 is a metal U-shaped bracket 37, as illustrated in FIGS. 4 and 5 and whose upper and lower integral parallel side walls have aligned apertures therein. Journalled in each aligned pair of apertures of each of said brackets 37 is a metal stub shaft or pin 38 which has a longitudinal slot 34 therein and also has a pair of spaced apart transverse apertures through its upper portion. A horizontal handle or transverse upper pin 39 is mounted in each of the upper apertures of each of said mounting pins 38, as shown in FIG. 5.

A transversely apertured metal collar 40 is secured by welding on the upper flange of each of the brackets 37 in alignment with the two holes in each of said brackets, and each rotatable pin extends through it and through the adjacent bracket, as illustrated in FIG. 5.

Each of said mounting pins 48 is adjustably and manually rotatable so that its lower transverse passage will align with the diametrically opposite holes in the adjacent collar 40 to removably mount therein a shorter metal locking pin 41 so that said mounting pins 38 are releasably locked in desired position to adjust the tension of scraper springs and arms hereinafter described.

A plurality of radially extending flexible spring-like arms or scrapers 42 have the inner end portion of each thereof wound into a helical coil 43 and the extreme terminal end portion of each thereof is inserted in the longitudinal slot 34 of the mounting pins 38 respectively, as illustrated in FIGS. 4 and 5. The main portion of each of said spring scrapers 42 extends radially adjacent the bracket 37 and outwardly, as illustrated in FIG. 3, and the extreme outer end portions 44 of said scrapers will more sharply scrape the hair and foreign matter from the carcasses.

Said integral coils 43 act as springs to permit the scraper arms to relatively easily yield and flex at the area of said coils and this avoids excessive degree of flexing and avoids breakage in the radially extending portions of said scraper arms. It will be understood that the degree of tightness of the coils 43 is adjustable by the proper rotation of the respective pins 38 and the re-locking of the same in the desired positions by re-insertion of the locking pins 41. This adjustability is highly advantageous in that the positioning and passage of carcasses of different sizes requires different degree of flexing and tensions to completely strip and scrape the carcasses without damaging the skin of the carcasses and without producing permanent marks thereon. Additionally, it is advantageous to set under greater tension those scraper arms which engage the legs, feet and head of the carcasses on which areas more firm stripping and scraping actions are needed to remove the congealed rosin coating and hair.

As shown in FIGS. 1 and 2, the upper projecting portion of shaft 22 has a sprocket 45 secured thereon in the same plane as sprocket 46 which is secured on the upper projecting end of driven shaft 20. The shaft 28 has a sprocket 47 secured thereon in the same plane with sprockets 45 and 46. An endless link chain 48 is mounted about sprockets 46 and 47 and it meshes with sprocket 45 as shown in FIG. 2, so that sprocket 45 and the left hand shaft 22 and its scraper arms is driven counterclockwise and sprocket 47 and shaft 28, pipe 31 and its scraper arms are driven clockwise, as viewed in FIGS. 2 and 3. This opposite rotation of the two separate sets of scraper arms produces a slow advantageous rotation of the suspended carcass as hereinafter described.

As illustrated in FIGS. 1 and 2, numeral 50 designates in cross section a track which is suitably secured and suspended to the top mounting plate 17 and centrally thereof by U-shaped metal brackets 61 which are suitably secured, for example by bolts, at their upper ends to top plate 17. Said track section 50 is normally in alignment with other overhead conveyor track sections on which the carcasses are transported in suspended positions from the dipping tanks (not shown).

Numeral 51 designates a U-shaped suspension trolley having a suitable grooved roller or pulley 51a engaging the said track section. Journalled in the lower part of trolley 51 is a depending swivelling eye bolt 52 whose lower end has secured to it a metal eye bolt 62 to whose lower hooked end is secured the eye of a yoke-shaped double hook 54. A substantially straight gambrel 55, having spaced apart annular grooves is removably mounted on the double hook 54, and the opposite ends of said gambrel are mounted in and extend through the middle joint portions of the rear legs of the hog carcasses.

Accordingly, each carcass is swively and rotatably suspended on its rollable trolley and as each carcass is moved into the machine between the two casings and between the two groups of flexible arms or blades, the end portions of the scraper arms and blades engage and scrape off the soft gelatinous strips and pieces of rosin containing the hair and dirt, and at the same time the carcass is slowly rotated by the action of said flexible scraper arms or blades so that all the areas of the carcass are properly and repeatedly scraped to completely remove the rosin coating and the hair, the said soft rosin coating also containing dirt and foreign matter. After the short interval during which all surfaces of the carcass are subjected to said scraping and cleaning action, the carcass is manually pushed out of the machine and the trolley on which it is suspended will ride on separate and aligned conveyor tracks to be moved to positions in which various subsequent steps of dressing are performed.

It is desirable to maintain the interior of our machine relatively hot during the hair removing operation on the carcasses to avoid the cooling of the hair and the rosin coating and the outer skin, as cooling would make it more difficult to remove the rosin coating and hair by means of driven scrapers. We provide a plurality of steam heated coils mounted on the floor in the lower part of the machine, and also provide heating coils mounted along the inner faces of said walls and casings.

As partially shown in FIGS. 1 and 2, numerals 63 and 64 designate two sets of vertically extending metal zig-zag heating pipe coils, each of which are communicatively connected to a steam supply pipe (not shown), a fragment of one of which is designated as 69 in FIG. 3. Said vertical heating coils 63 and 64 radiate heat throughout the area within and between said walls and casings to maintain the surfaces of carcasses and the rosin coatings thereon relatively hot. Said heating coils 63 and 64 are secured to their adjacent respective walls of the casings by suitable anchors or fasteners (not shown).

As shown in FIGS. 1 and 3, a second pair of substantially horizontal metal heating coils 65 and 66 mounted on the base plates 10 and 11 below said aprons 67 and 68, respectively, are connected to aligned header pipes 57, as shown in FIG. 3, one of which header pipes is suitably connected to a source of steam by a suitable pipe 69a, a fragment of which is shown in the upper part of FIG. 3. Each of said lower heating coils 65 and 66 comprises a plurality of semi-circular spaced apart pipes which have their opposite ends secured by welding to the lower header pipes 57 over suitable apertures (not shown), in said header pipes 57 so that said arcuate pipes and said header pipes 57 are in substantially the same plane to form flat heating coils.

Another lower heating coil 65' is positioned on the floor under the left casing and left side of the machine, and a companion lower heating coil 66' is positioned on the floor under the other and right side of the machine. The heat from said coils rises and maintains relatively hot the areas within and between the side walls of the machine so that the hair, the rosin coating containing hair and the outer skin will be effectively and fully removed by the action of said driven arms and scrapers.

As shown in FIG. 1, numerals 67 and 68 are two metal inwardly inclined substantially semi-circular panels or aprons whose upper outer edges are secured, for example by welding, to the inner faces of the two curved walls 15 and 16, respectively. The lower inner edge of each of said aprons are bent downwardly and extend inward beyond the inner edges of the base plates 10 and 11. Each of said aprons are apertured and preferably made of two recessed sections of sheet metal which are secured, as stated, in inwardly inclined planes to facilitate their mounting so that the driven vertical shafts extend through said aprons respectively. Stripped and removed pieces of coating, hair and foreign matter drop on said inclined aprons 67 and 68 and are deflected and slide to the floor for later removal.

When each carcass, which has been coated with a rosin coating as stated, is moved while suspended in the described manner into said machine, the end portions of the flexible scraper arms engage the carcass and remove the rosin coating along with the hair and foreign matter which remains on the carcass. The scraper arms strike the edges of the vertical bars 14 following engagement with the carcass, as illustrated at the top of FIG. 3, causing the adhering matter to be removed from the arms and to drop on the aprons 67 and 68. At the same time, the action of the rotating scraper arms slowly rotates the carcass so that all areas and parts of the carcass are engaged by said scraper arms to effectively remove the rosin coating and the dirt and hair which such coating contains.

After a short interval, during which each carcass has had the hair, the rosin coating and the outer skin stripped and removed in the described manner, the carcass is pushed or pulled from within the machine and moved while it is suspended by rolling the movable trolley onto a suitable overhead track or conveyor rail to other successive positions in the dressing room in which other steps of dressing and preparation are performed on the carcass.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:

1. In a machine for stripping and dehairing hog carcasses; a pair of inwardly opening vertically extending opposed spaced apart metal casings; vertical standards supporting said casings; a pair of base plates; a top mounting plate connected on both of said casings; a vertical shaft journalled in one of said base plates and in said top plate; a second vertical shaft journalled in the other of said base plates and in said top plate; a prime mover mounted on said top plate; a stub shaft and sprocket thereon operatively connected to said prime mover; a pair of sprockets on the upper ends of said vertical shafts respectively; an endless chain operatively connecting all of said sprockets; and on each said vertical shaft a plurality of circumferentially spaced radially extending flexible metal arms connected at the inner end of each arm to the shaft, the outer end of each arm being free; said arms on one of said shafts being in staggered relation relative to the arms on the other vertical shaft; and the outer end portions of said arms being adapted to engage suspended hog carcasses moved between said vertical shafts and the said radial arms thereon to strip coatings from said carcasses and remove hair therefrom, said arms on each shaft being disposed in staggered relationship therealong to subject all surfaces of the carcasses to engagement with the arms.

2. In a machine for stripping coatings from and dehairing suspended hog carcasses; a pair of inwardly opening vertically extending opposed spaced apart metal casings; vertical standards supporting said casings; each of said casings having an apertured base plate; a top mounting plate on both of said casings; a vertical shaft journalled in the base plate and in said top plate of one of said casings; a second vertical shaft journalled in the base plate and said top plate of the other of said casings; a prime mover mounted on said top plate; a stub shaft and sprocket operatively connected to said prime mover; a pair of sprockets on the upper ends of said vertical shafts respectively; an endless chain operatively connecting all of said sprockets; on each said vertical shaft a plurality of circumferentially spaced radially extending flexible metal scrapers connected at the inner end of each scraper to the shaft, the outer end of each scraper being free; the outer end portions of said scrapers being adapted to engage suspended hog carcasses moved between said vertical shafts and the said radial scrapers thereon to remove hair or the like from said carcasses, said scrapers on each shaft being disposed in staggered relationship therealong to subject all surfaces of the carcasses to engagement with the scrapers; and a plurality of heat radiating pipe coils mounted adjacent the inner sides of said casings respectively and adapted to maintain relatively hot the areas within and between said casings.

3. In a machine for stripping coatings of rosin or the like from suspended hog carcasses; a pair of supported upwardly extending spaced apart metal casings; each of said casings having an apertured base plate; a transversely extending mounting plate connecting the upper ends of said casings; a substantially vertical shaft journalled in each of said base plates and said mounting plate respectively; a prime mover connected to said mounting plate; a stub shaft and sprocket mounted on said mounting plate and operatively connected to said prime mover; a pair of sprockets on the upper ends of said vertical shafts respectively; an endless chain operatively connecting all of said sprockets; on each said vertical shaft a plurality of circumferentially spaced radially extending flexible metal arms connected at the inner end of each arm to the shaft, the outer end of each arm being free; said arms on one of said shafts being in staggered relation relative to the arms on the other vertical shaft; and scraper means on the outer ends of said arms, said scraper means being adapted to engage hog carcasses moved between said vertical shafts to strip coatings therefrom, said arms on each shaft being disposed in staggered relationship therealong to subject all surfaces of the carcasses to engagement with the scraper means; and heat conducting coils mounted in said casings.

4. A machine for stripping and for dehairing hog carcasses substantially as recited in claim 3, and having supported swivelling means for suspending the hog carcasses in downwardly extending direction and adapted to permit rotation of said carcasses while suspended, and said arms when rotated, being adapted to rotate and scrape said suspended carcasses.

5. In a machine for stripping and dehairing hog carcasses; a pair of elongated spaced apart supported upwardly extending walls; a supported apertured base plate secured on the lower end of each of said walls; a transverse apertured top plate connecting the upper ends of said walls; a pair of vertically extending spaced apart shafts having their lower ends journalled in said base plates respectively and having their upper ends journalled in said top plate and extending above said top plate; sprockets mounted on the upper ends of said shafts; a prime mover connected to said top plate; a stub shaft connected to said prime mover and extending above said top plate; a sprocket on the upper end of said stub shaft; an endless link chain operatively connecting said sprockets of all of said shafts; a plurality of circumferentially spaced transversely extending metal flexible arms connected to each of said first mentioned vertical shafts and having outer free ends; the driven rotation of said first mentioned shafts being adapted to move said arms to cause their outer ends to engage and scrape coatings and hair from hog carcasses positioned between the shafts and arms thereon, said arms on each shaft being disposed in staggered relationship therealong to subject all surfaces of the carcasses to engagement with the arms.

6. A machine for stripping and dehairing hog carcasses, as recited in claim 5, and having a track element carried by said top plate, and a trolley mounted on said track element, and swivelling hook means on said trolley for suspending hog carcasses on said trolley whereby the rotation of said shafts and said arms is adapted to rotate said hog carcasses during engagement thereof by said rotating arms.

7. In a machine for stripping and dehairing hog carcasses; a pair of spaced apart vertically extending side walls; a pair of supported apertured bases; a top mounting plate connecting the upper end portions of said side walls; a pair of spaced apart vertically extending shafts journalled at their opposite ends in said bases and in said top mounting plate respectively; sprockets mounted on the upper ends of said shafts; a prime mover connected to said top mounting plate; a driven sprocket operatively connected to said prime mover; an endless link chain connecting said sprockets; a plurality of radially extending flexible scraper arms having an inner coiled end on each thereof adjustably connected in vertically staggered relation on said vertical shafts; said scraper arms on one shaft being in staggered relation with respect to the arms on the other of said shafts and said scraper arms being adapted to yieldably engage and strip coatings from hog carcasses; and manually adjustable means on the inner coiled end portions of said scraper arms for adjusting the tension of said scraper arms.

8. In a machine for stripping and dehairing hog carcasses; a pair of spaced apart vertically extending side walls; a pair of supported apertured bases; an upper mounting plate connecting the upper end portion of said side walls; a pair of vertically extending shafts journalled at their opposite ends in said bases and in said upper mounting plate respectively; sprockets mounted on the upper ends of said shafts; a prime mover connected to said upper mounting plate; a driven sprocket operatively connected to said prime mover; an endless link chain connecting said sprockets; a plurality of radially extending channel-like apertured brackets mounted in spaced relation on said shafts; a manually adjustable pivot pin mounted in the apertures of each of said brackets; a plurality of flexible scraper arms; each of said scraper arms having a helical end portion mounted on said pins respectively and having an intermediate portion thereof engaging said brackets; an adjustable locking pin removably mounted in each of said pivot pins to prevent movement thereof; said pivot pins being adjustable to vary the tension of the helical end portion respectively of said scraper arms, an inwardly and downwardly inclined apron mounted adjacent the lower part of each of said side walls and adapted to deflect pieces of coatings and hair to the lower middle portion of said machine.

9. A machine for stripping and dehairing hog carcasses substantially as described in claim 8 and in which said link chain is adapted to drive said separate vertical shafts and the scrapers thereon in opposite directions, and having a rail supported rollable trolley below said upper mounting plate, and having swivelling mechanism for suspending carcasses thereon to provide for rotation of suspended carcasses by the rotative action of said scraper arms.

10. The combination, in a carcass stripping and scraping machine, of a pair of spaced apart upwardly extending rigid spaced apart walls; a top mounting plate connecting the upper end portions of said walls; a pair of base plates connected to said walls respectively; said spaced apart walls providing a path therebetween for movement therethrough of carcasses; a pair of spaced apart vertical shafts journalled on said top mounting plate and in said base plates respectively; a plurality of flexible radially extending circumferentially spaced apart scrapers connected to each of said vertical shafts and having outer free ends extending into the path between said walls and between said shafts; sprockets mounted on the upper ends of said shafts; a prime mover connected to said top mounting plate; a driven sprocket operatively connected to said prime mover; a link chain operatively connecting said sprockets; the outer ends of said scapers being adapted to yieldably engage and remove hair and foreign matter from said carcasses when positioned between said vertical shafts, said scrapers on each shaft being disposed in staggered relationship therealong to subject all surfaces of the carcasses to engagement with the scrapers and heating coils mounted inward of said walls and adapted to heat the area between said walls.

11. A carcass stripping and scraping machine as recited in claim 10 and wherein said scrapers each have a helically coiled portion; and having brackets mounted in circumferentially spaced apart positions on said vertical shafts, and having means for adjustably connecting the helical portions of said scrapers to said brackets respectively.

References Cited in the file of this patent

UNITED STATES PATENTS

| | | |
|---|---|---|
| 1,180,874 | Ozouf | Apr. 25, 1916 |
| 1,834,479 | Taylor | Dec. 1, 1931 |